Apr. 3, 1923.  
H. H. ILLCH  
1,450,551  
ATTACHMENT SHIELD FOR AUTOMOBILE WINDSHIELDS  
Filed Feb. 24, 1922  2 sheets-sheet 2
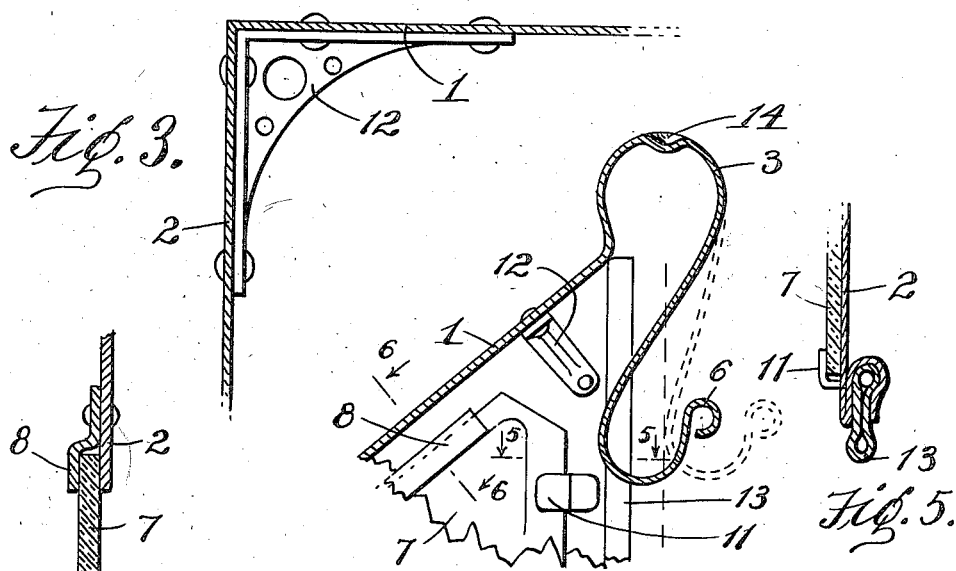
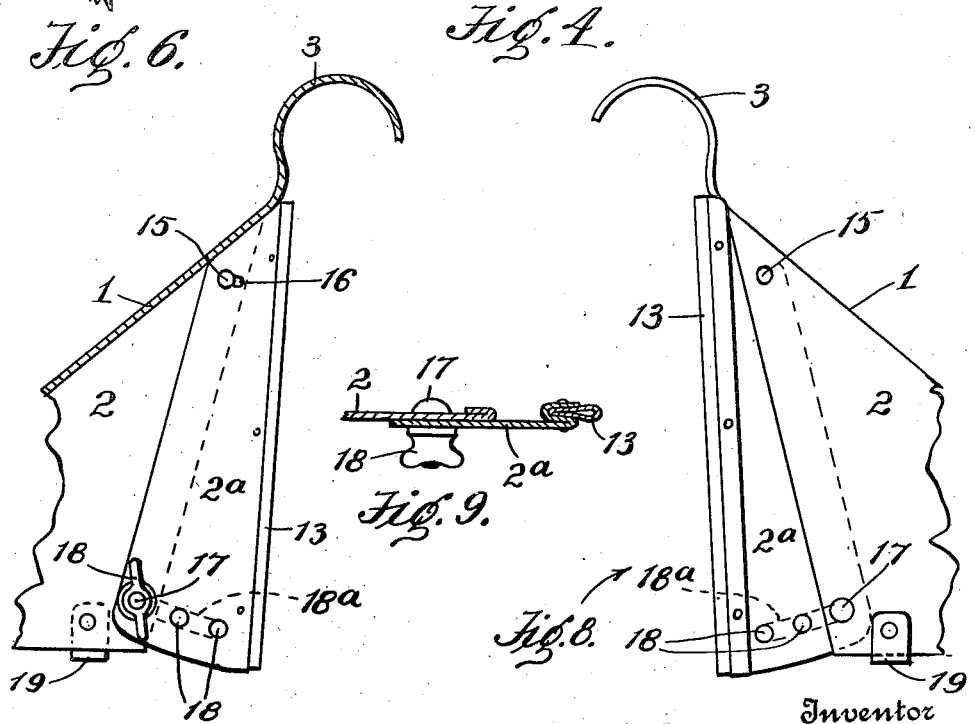
Inventor  
Herbert H. Illch  
By his Attorney Patented Apr. 3, 1923.

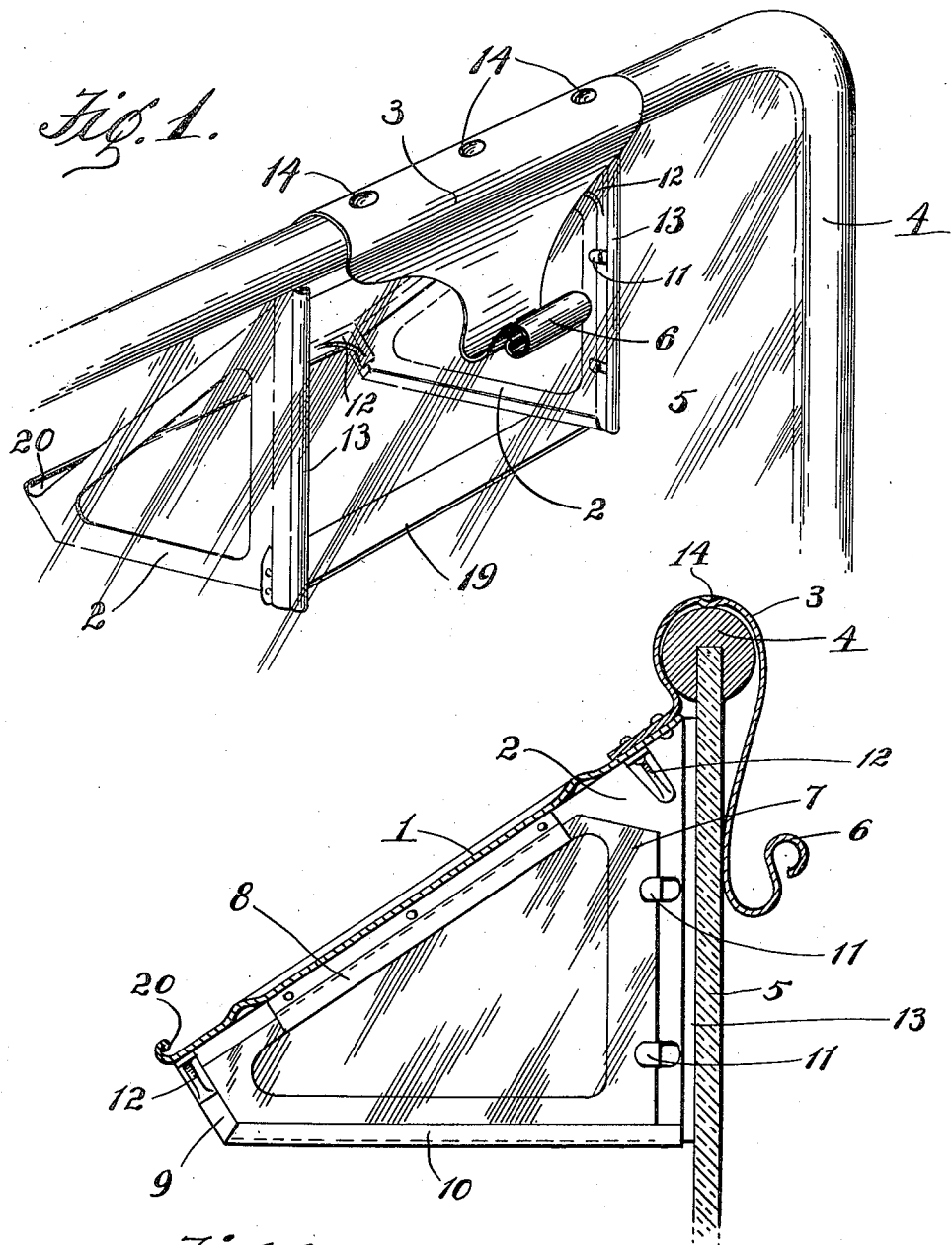

1,450,551

UNITED STATES PATENT OFFICE.

HERBERT H. ILLCH, OF NEW YORK, N. Y.

ATTACHMENT SHIELD FOR AUTOMOBILE WINDSHIELDS.

Application filed February 24, 1922. Serial No. 538,893.

*To all whom it may concern:*

Be it known that I, HERBERT H. ILLCH, a citizen of the United States, and resident of New York, in the county of New York and State of New York, have invented certain new and useful Improvements in Attachment Shields for Automobile Windshields, of which the following is a specification.

This invention relates to improvements in auxiliary shields adapted to be applied upon the wind shield of an automobile and is in the nature of an improvement upon a patent for a similar device issued to me on February 24, 1920, and bearing Number 1,332,126.

A particular object of this invention is to provide a means, attachable to the wind shield of an automobile, whereby the driver's eyes are shielded from the direct or reflected rays and strong light coming from the direction in which the operated machine is being driven.

Another object is to provide a device of this character which will prevent the deposit of moisture from rain or snow upon the glass of the wind shield and thus obscure the view of the driver.

A further object is to provide a device, of the character described which may readily be moved transversely along the face of the glass of the wind shield, to remove any moisture which may be deposited thereon by rising beneath the device.

Detachable shields, of this character have heretofore been made but, all have been more or less complicated and impracticable in operation, while none of them comprised the sliding feature of the device herein described.

The objects set forth are attained by the device illustrated in the accompanying drawings in which:—

Figure 1. is a perspective view, of the improved device attached to the top of the wind shield of an automobile; only a portion of the wind shield being shown;

Figure 2. is a sectional elevation approximately through the center of the device;

Figure 3. is a detail view, of a reinforcing bracket hereinafter described;

Figure 4. is a detail section;

Figure 5. is a detail section through the line 5—5, of Figure 4;

Figure 6. is a detail section through the line 6—6, of Figure 4;

Figures 7, 8, and 9, are details showing modifications which will be hereinafter described.

Referring in detail to the parts, 1, designates an inclined front panel of the shield from which side panels, 2, extend downwardly, at approximately right angles thereto. The upper end of the panel 1, along its full width, extends upwardly and approximately in a circular form as at 3, forming a spring looped member to embrace the upper rim, 4, of a wind shield, 5. The said loop, so formed, extends downwardly and is contracted in width and turned and rolled to form a handle, 6, which is approximately hand size.

The particular formation and construction of the said loop, prevents leakage between the device and the wind shield to which same is attached. The spring acting to hold the contacting vertical edges snugly in place.

The inclined panel, 1, is preferably opaque while the side panels, 7, are preferably transparent. The transparent element, 7, preferably glass, is held upon the side panels by means of the grooved members, 8, 9, 10, and the clips, 11, which may be riveted or formed integrally with said side panels.

Reinforcing angular members, 12, are provided and suitably attached in the corners of the device to stiffen the folding line at the juncture of the front and side panels.

The flexible strip, 13, is suitably connected along the vertical edge of each side panel and contacts closely with the glass of the wind shield. The said flexible material is preferably of rubber tubing held in the manner shown in Figure, 5. The loop member, 3, is provided with depressions or friction reducing buttons, 14.

In Figure, 2, the loop member is shown as a separate element attached to the front panel, 1, whereas in Figure, 4, same is shown as an integral continuation of the panel, 1. Either construction may be employed in the device.

In Figures, 7, 8, and 9, the modifications shown have reference to a means for adjusting the flexible edge when the wind shield is held at an inclined position, as is common on some automobiles. In this form the flexible member, 13, is held upon a movable end piece, $2^a$, which is attached to the side panel, at its upper end, by means of a pin, 15, which engages through a perforation, 16, formed upon the end piece $2^a$.

At the lower end, the bolt, 17, engages through a perforation in the side panel, 2, and through anyone of the series of perforations, 18, in the sliding piece, 2ª, and is held securely in place by means of a set-screw, 18. The perforations, 18, might be replaced by a slot extending from the first perforation to the last as indicated by dotted lines, 18ª.

As an additional bracing means, supplementing the reinforcing members, 12, a rod, 19, may extend from one side panel to the other as shown in Figures 1 and 7.

The front panel, 1, is preferably opaque and thereby prevents direct rays or glare of light from entering the driver's eyes, and during a rain or snowfall, raindrops or particles of snow are prevented from coming in contact with the glass of the wind shield to obscure the driver's vision. It sometimes happens, in a heavy snowfall or during a high wind, that the particles of moisture may rise or be driven under the shield and come in contact with the glass. When this occurs the driver grasps the handle, 6, of the device and by a sidewise movement back and forth may clear the glass through the action of flexible ends, 13, which are in close contact with the glass.

A gutter, 20, is formed at the lower front edge of the device, to prevent dripping along the front length of the inclined panel.

Various modifications may be embodied in this invention without departing from the spirit of same and it is not intended, therefore, to limit this invention to the particular embodiment shown.

What is claimed:—

1. In an auxiliary-shield for automobile wind-shields provided with a moisture wiping means, an inclined shielding-panel adapted to be attached to a wind-shield of an automobile, downwardly extending side-panels formed upon the inclined panels, transparent inserts in the side and top panels, resilient members formed upon the edge of the side panel and adapted to engage along the surface of the glass of the wind-shield to remove moisture therefrom, a spring-loop formed upon the inclined panel and providing a means for attaching the device to the upper part of the wind-shield, a handle member to provide a means for sliding same against the surface of the glass of the wind-shield.

2. The device of claim 1, wherein friction reducing contacting surfaces are formed upon the attaching loop.

3. The device of claim 1, wherein the resilient members of the side-panels are adjustable.

4. The device of claim 1, wherein the inclined-panel is provided with a drip-gutter along its lower front edge.

Signed at New York in the county of New York and State of New York this 15th day of June A. D. 1921.

HERBERT H. ILLCH.